United States Patent [19]

Bechtel

[11] Patent Number: 4,884,714

[45] Date of Patent: Dec. 5, 1989

[54] SECURABLE AND REMOVABLE UTILITY RECEPTACLE

[76] Inventor: James B. Bechtel, 116 Nottoway Dr., Penllyn, Pa. 19422

[21] Appl. No.: 181,699

[22] Filed: Apr. 14, 1988

[51] Int. Cl.$^4$ ............................................. A47J 47/16
[52] U.S. Cl. ......................................... 220/69; 4/656;
  206/818; 211/2; 211/41; 220/85 R
[58] Field of Search ............................. 4/650, 654–658;
  206/818; 211/2, 41, 86, 126, 133, 181; 220/18,
  18.1, 69, 85 R; 248/205.1–206.5; 269/289,
  302.1, 305, 309

[56] References Cited

U.S. PATENT DOCUMENTS

| | | | |
|---|---|---|---|
| 624,797 | 5/1899 | Harris | 269/302.1 |
| 699,629 | 5/1902 | Patten | 269/302.1 |
| 768,341 | 8/1904 | Patten | 269/302.1 |
| 810,101 | 1/1906 | Black | 269/302.1 |
| 1,185,677 | 6/1916 | Jargstorf | 211/41 |
| 1,349,771 | 8/1920 | Kline | 4/656 |
| 1,729,502 | 9/1929 | McGregor | 4/656 |
| 2,451,653 | 10/1948 | Bazelon | 248/205.6 |
| 2,609,024 | 9/1952 | Russ | 269/289 |
| 3,762,673 | 10/1973 | Koslovsky | 211/86 |
| 4,363,402 | 12/1982 | Grzyll | 206/818 |
| 4,480,343 | 11/1984 | Drach | 211/2 |
| 4,544,068 | 10/1985 | Cohen | 211/126 |

FOREIGN PATENT DOCUMENTS

| | | | |
|---|---|---|---|
| 2821841 | 11/1979 | Fed. Rep. of Germany | 211/126 |
| 0950602 | 10/1949 | France | 247/206.3 |

*Primary Examiner*—Jimmy G. Foster
*Attorney, Agent, or Firm*—James B. Bechtel

[57] ABSTRACT

A releasably securable utility rack is disclosed. The rack can be releasably affixed through suction cups or magnets, alongside a sink, or any other convenient location, to guide run-off water or other liquids, through an appropriately-sized and shaped lip-extension, into the sink. Various attachments to the rack can provide, for example, dish holding means to contain dishes, or a cutting surface to prepare food on. The rack may be made from either a rubber-coated base or a similar material, such as extruded plastic.

23 Claims, 4 Drawing Sheets

SECURABLE AND REMOVABLE UTILITY RECEPTACLE

BACKGROUND OF THE INVENTION

The instant invention is directed toward appliances used in the kitchen areas of the modern apartment, mobile home or townhouse. It is directed toward the utility items that provide a person in these areas with a multiple number of conveniences in a small package.

As housing space becomes more costly, there has started a movement to reduce the amount of space that each room in a dwelling takes. When this reducing practice is applied to the kitchen, a room used for so many purposes, the result can lead to inconvenience. In a large number of new apartments, townhouses, condominiums and even single family homes being built today, countertop space in the kitchen (and the cabinets or drawers underneath) is the first to go when cut-backs are made. But, although the space is reduced, the number of functions, such as preparing food, cooking it and cleaning up after a meal, still must be accomplished. The instant invention allows a number of these functions to be performed in a reduced space.

SUMMARY OF THE INVENTION

A securable utility receptacle designed to be used in areas of limited countertop space around a sink is disclosed. The receptacle has a flat, generally rectangular base of predetermined length and width, two oppositely-disposed side walls joined thereto, a back wall connected to the base and side walls and a front lip, in the form of a ninety degree bend to fittingly grasp the side edge of a sink, oppositely disposed from said back wall and extending from the front edge of the base. At least one securing means, such as a combination magnet/clamp, or either one thereof used by itself, is affixed underneath the back wall to secure the back wall, and therefore the whole rack, to a desired spot on an adjacent countertop. In a preferred embodiment, corner alignment means are set onto the top surface of the base adjacent one or each of the inner corners to fix a foundation for attachments, such as a dish fence or a cutting board or an extendible arm for holding items to be rinsed under running tap water, thereto. Additionally, the upper edges of the side and back walls can be formed to releasably grasp hooks that can be used to securely clamp said attachments into said rack.

OBJECTS OF THE INVENTION

It is therefore an object of the present invention to provide a securable utility receptacle that allows a multitude of functions to be performed in a kitchen or other area within a conveniently sized space adjacent a sink.

It is a further object of the invention to provide a securable utility receptacle that allows a multitude of functions to be performed within a conveniently sized space and that can be easily removed from said space for storage.

It is a still further object of the invention to provide a securable utility receptacle that can be adapted for use as a dish drainer for wet dishes.

It is a still further object of the invention to provide a securable utility receptacle that can be adapted for use as a chopping or cutting or rinsing area for preparing food.

It is a still further object of the present invention to provide a releasably securable utility rack that utilizes the weight of objects placed therein to lower the center of gravity thereof to cause said rack to set more firmly on a surface.

These and other features, objects and advantages of the invention will, in part, be pointed out with particularity and will, in part, become obvious from the more detailed description of the invention taken in conjunction with the accompanying drawings which form an integral part thereof.

DETAILED DESCRIPTION OF THE INVENTION

Figure 2:
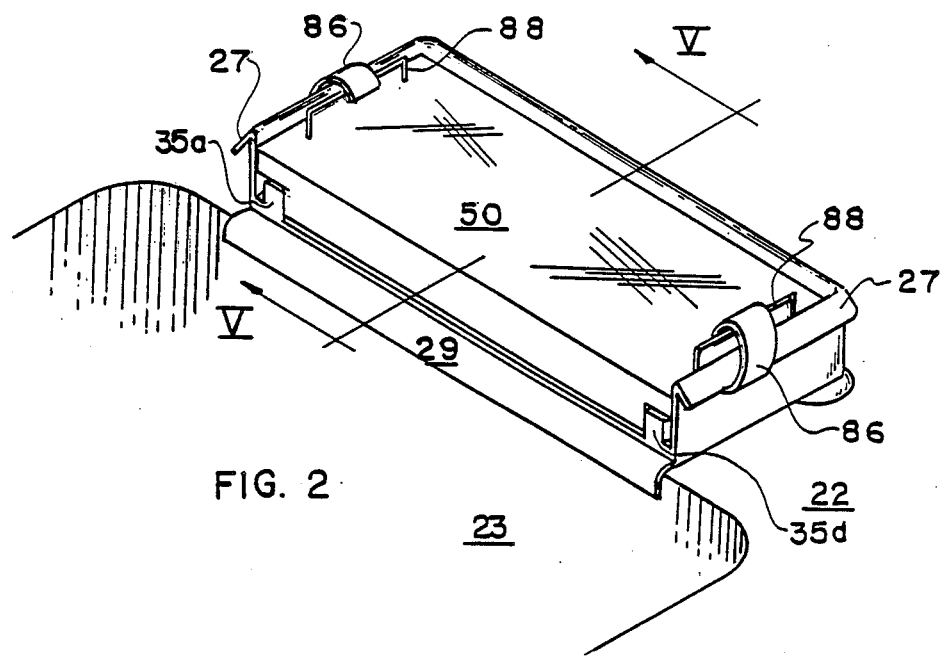
FIG. 2 shows a perspective view of the securable utility receptacle of FIG. 1 in an alternate form having a cutting board therein.
Figure 3:
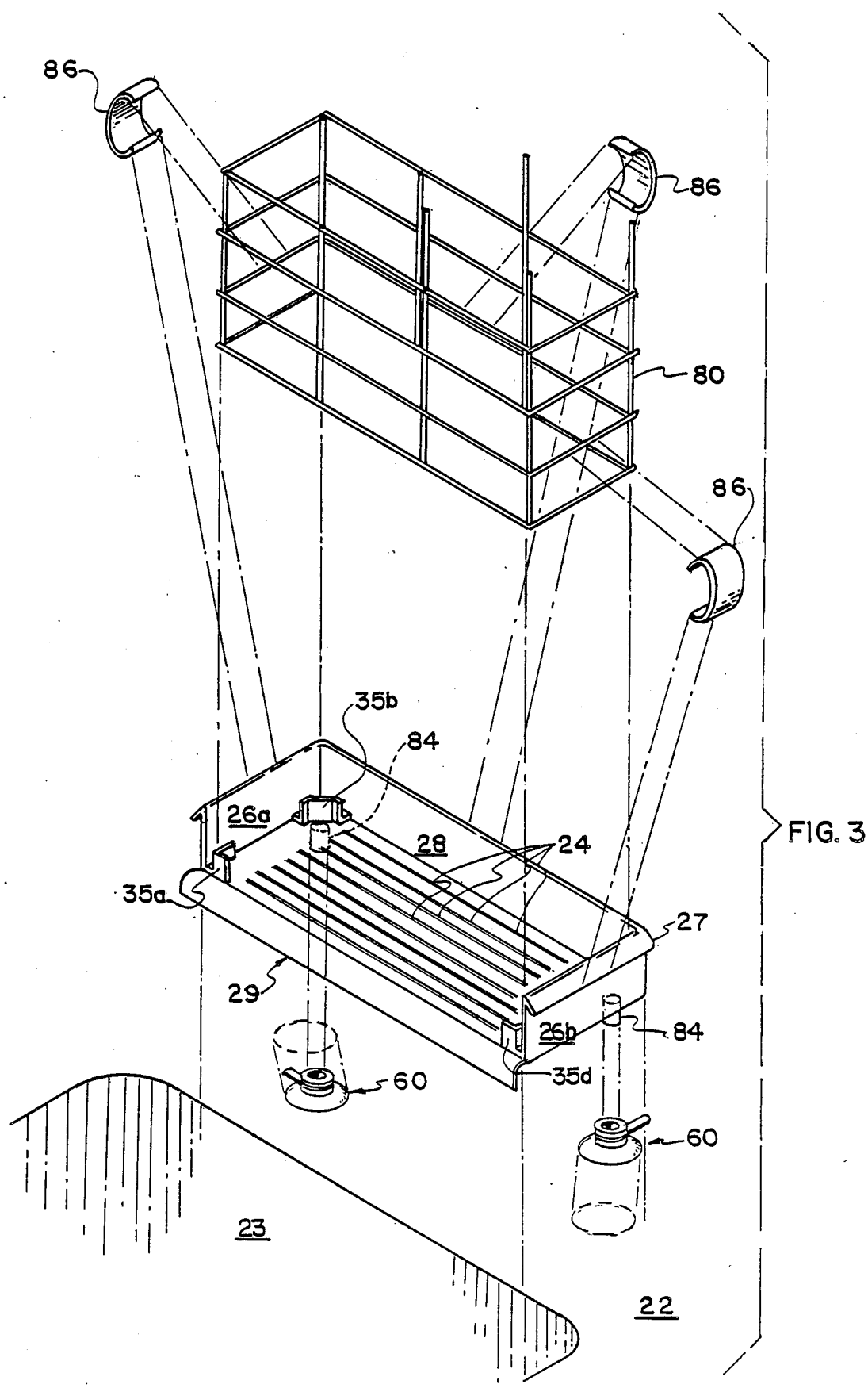
FIG. 3 shows an expanded view of the form of FIG. 1.

A utility receptacle or rack 20 is shown in perspective view with a dish fence 80 attached thereto, as will be explained below, in FIG. 1. Rack 20 can be affixed to a countertop 22 adjacent a sink 23 by releasing means 60, as will be explained. FIG. 2 shows a perspective view of an alternate form of the rack 20 of FIG. 1. As can be seen in FIG. 3, an expanded view of the rack of FIG. 1, rack 20 has a base 25, in the form of a rectangular plate, or other thin shape, with a top surface for supporting objects and a bottom surface (not shown in FIGS. 1 or 2), and a pair of side walls 26A, 26B, a back wall 28 and a front lip 29, all joined thereto, to form a tray-like receptacle 20. Rack 20 can be formed in various geometric shapes and constructed of various materials and produced by various ways, such as by vacuum forming, injection molding or blow molding of a thermally formable plastic material or the like.

Lip 29 forms an extension of the top surface of base 25 and curls in approximately ninety degrees, with a predetermined radius, to overlie the contour of the edge of sink 23. Lip 29 acts both as a positioning device and as a guide to direct the flow of any liquids that spill into rack 20 into the sink. To securely attach rack 20 to a spot on a countertop, adjacent a sink or other depression, lip 29 is set over the edge and releasing means 60 is fastened, by known clamping devices or magnetic devices, to the countertop. Rack 20 is useful for many different functions, as will be explained below, once it is secured into place, but can easily be removed for storage or cleaning by merely releasing means 60 and lifting the receptacle out of the way.

Figure 4:
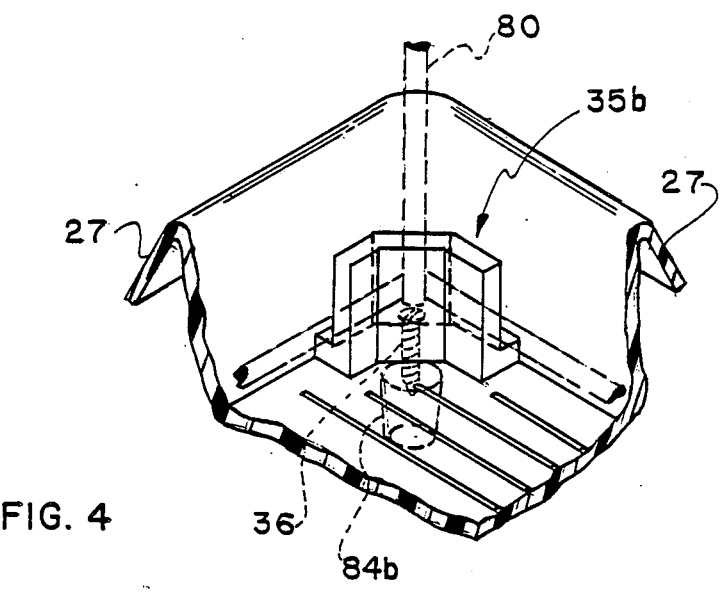
FIG. 4 shows an enlarged partial sectional view of the inside corner alignment means taken along lines IV-IV of FIG. 1.

The top surface of rack 20 can have conveniently spaced ribs, or ridges 24, thereon to provide a non-skid surface for dishes. Rack 20 has corner support means 35A,B,C (not shown in FIGS. 1 or 3) and D built inside its inner corners. FIG. 4 is taken along lines IV-IV of FIG. 1 and shows an isolated sectional view of one form of support means 35B with dish fence 80 and a rear footing 84 shown in phantom.

Figure 1:
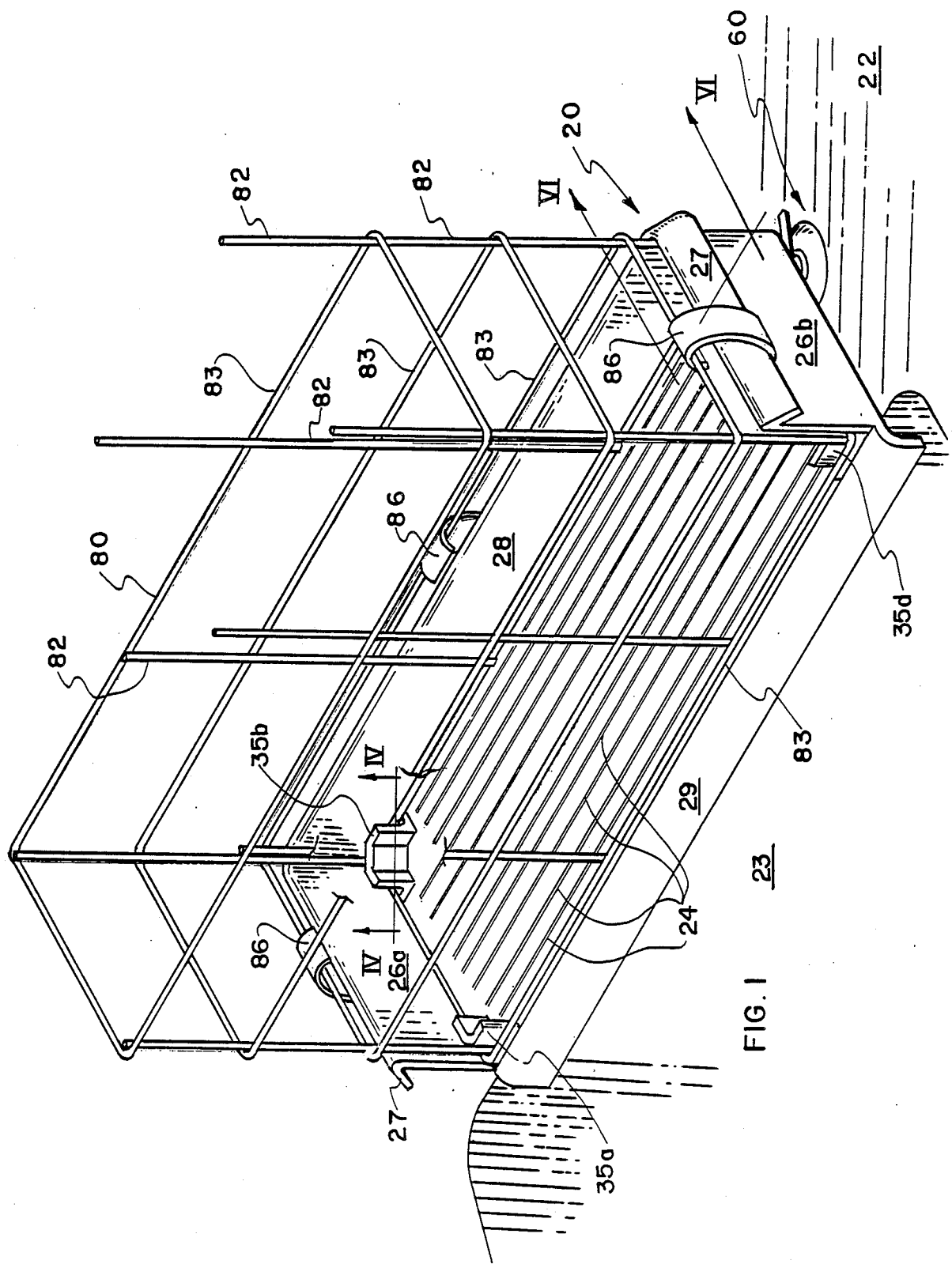
FIG. 1 shows a perspective view of the securable utility receptacle affixed to the edge of a sink with a dish fence attachment affixed thereon.
Figure 5:
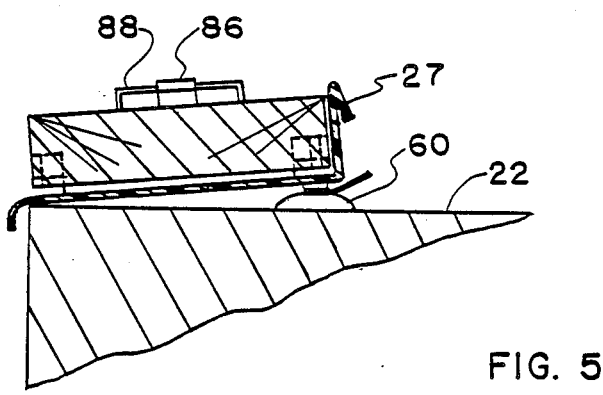
FIG. 5 shows sectional view of receptacle 20 taken along lines V-V of FIG. 2.

Support means 35 can be either a single-fold (35A and 35D) or a double-fold (35B or 35C) abbreviated piece, as shown in FIG. 1, that can be made from hardened rubber, plastic or a similar material. Means 35 is strategically placed adjacent each inner corner of base 25 a predetermined distance, to hold the bottom rib of dish fence 80 or the underside corner of a board 50, and secured thereto by means known in the art. In a preferred embodiment, means 35B and C can be secured by a stainless steel, or other easily-cleanable material, screw 36B, C (only 36B shown in phantom in FIG. 4) that conveniently anchors rear footing 84B (also shown in phantom) or a securing means 60 to a predetermined spot such as a corner or the mid-point (as in FIG. 5) on the underside of base 25. Added attachments such as dish fence 80 or a cutting board 50 (see FIG. 2) are appropriately sized at one end to fittingly engage securing means 35 to be anchored into base 25. Cutting board 50 can be plastic or wood, and, in an alternate embodiment, can have quarter-circles cut into its corners on its underside.

As shown in FIG. 1, dish fence, or a dish drying container, 80 can be a plurality of rods 82 set and connected perpendicular to at least two continuous ribs 83. The fence 80 can be conveniently sized to snap into means 35 and will be strong enough not to buckle when dishes are placed therein. A continuous sheet of a plastic material (not shown) could be used, and clips or other forms of known grasping means, such as at 86, are employed to releasably secure an attachment, such as fence 80 or chopping board 50 into base 25. Clips 86 are made in a form of the letter "C" to hook over one of the ribs 83 of dish fence 80 or over board handles 52 and under folded rim 27 of base 25. A shown in FIG. 2, some of rods 82 can be made such that their top ends extend above uppermost rib 83, to provide a convenient hanging post for cups or the like.

As earlier mentioned, releasing means 60, such as releasable suction cups or magnets ca be affixed underneath the back edge of base 25 (see FIG. 5), to releasably secure rack 20 to a predetermined spot on the countertop 22. In a preferred embodiment, releasable suction cups, as known in the art, can be used to secure base 25 to the countertop 22 adjacent sink 23.

Figure 6:
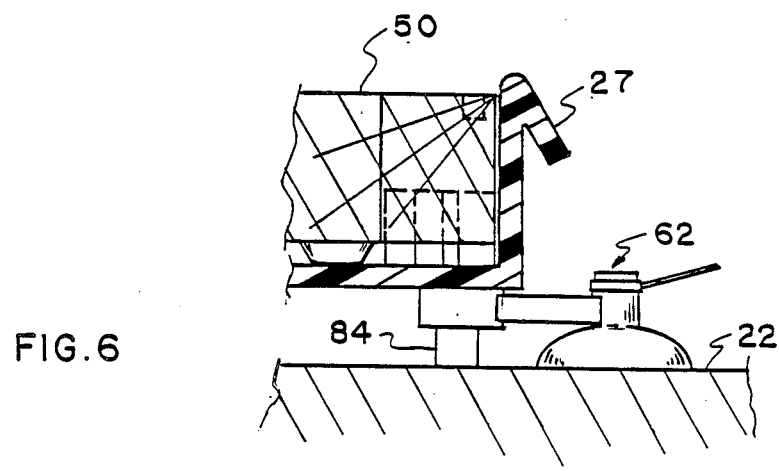
FIG. 6 shows a partial sectional view, taken along lines VI-VI of FIG. 1.

As seen in FIG. 6, a partial sectional view, taken from FIG. 1, of the corner of base 25, an alternate releasing means 62 is offset from rear footing 84. Additionally, rim 27, such as from folding an edge of base 25 back 330° from the inside wall, provides a convenient securing place for C-clip 86. Clip 86 is placed over handle 88 on board 50.

The rack and dish fence combination have been designed to achieve a lower center of gravity, for the rack and dishes placed inside of it, as more dishes are piled in. Additionally, as more dishes are piled in, the weight of the rack is more concentrated over the countertop, thus providing a safety factor. Of course, whether any dishes are placed in the dish fence or whether a cutting board is used inside the rack, releasable means 60 affixes the rack to the countertop.

Obviously, many modifications and variations of the present invention are possible in light of the above teachings, and, it is therefor understood that within the scope of the disclosed inventive concept, the invention may be practiced otherwise than specifically described.

What I claim is:

1. A securable and removable utility receptacle for use on a countertop next to an edge of a sink comprising:
   a. a supporting surface being a two-dimensional sheet-like base with a front portion and a rear portion, having a top surface and an oppositely-disposed bottom surface, said bottom surface having the front portion adapted to rest on a substantially flat two dimensional surface, adjacent the edge of a sink, with no affixing means attached thereto and to form an acute angle with the substantially flat two dimensional surface; and
   b. at least one suction cup affixed to the rear portion of the bottom surface, said suction cup being removably securable to a predetermined spot on the countertop to position the receptacle at a predetermined position at the sink's edge when said bottom surface resides at said acute angle.

2. A utility rack as described in claim 1 wherein said front portion is adapted to curl over the edge of the sink by being in the shape of an arc of substantially ninety degrees.

3. A utility rack as described in claim 2 wherein said top surface has at least two corners and is bounded at its perimeter by edges raised from said surface.

4. A utility rack as described in claim 1 wherein a plurality of clips for removably securing a dish fence therein are fastened into the corners of said top surface.

5. A utility rack as described in claim 1 wherein said top surface has at least two corners and is bounded at its perimeter by edges raised from said surface and wherein a plurality of clips for removably securing a dish fence therein are fastened into the corners of said top surface.

6. A utility rack as described in claim 5 wherein a dish, holding container is releasably secured on said top surface.

7. A utility rack as described in claim 6 wherein said top surface is a cutting board.

8. A utility rack as described in claim 7 wherein a cutting board is releasably secured on said top surface.

9. A securable and removable dish receptacle for use on a countertop next to the edge of a sink, comprising:
   a. a supporting surface, being a two-dimensional, sheet-like base with a front portion and an oppositely-disposed rear portion and having a top surface and a bottom surface, said top surface having at its perimeter an orthogonally extending edge and said bottom surface making an acute angle with the countertop at the front portion.
   b. retaining means fixed to the rear portion of the bottom surface for releasably retaining said receptacle in a predetermined position on the countertop;
   c. a front edge extending from the front portion and adapted to fit the edge of a sink;
   d. a dish fence supported on the top surface, said fence extending substantially around the perimeter of said surface; and
   e. a plurality of clips secured on the top surface to releasably fasten said fence thereto.

10. A dish receptacle as described in claim 9 wherein said retaining means is a plurality of suction cups.

11. A dish receptacle as described in claim 9 wherein said retaining means is at least one magnet.

12. A dish receptacle as described in claim 9, including fastening C-shaped clips to removably hold said dish fence to said perimeter of the top surface.

13. A dish receptacle as described in claim 9 wherein said front edge forms a curved portion of approximately 90 radial degrees.

14. A dish receptacle as described in claim 9 wherein the bottom surface makes an acute angle, at the edge of the sink, with the countertop.

15. A dish receptacle as described in claim 9 wherein said front edge is a guiding means to provide a liquid run-off path from the top surface into the sink.

16. A securable and removable cutting board assembly for use on a countertop next to the edge of a sink, comprising:
   a. a supporting surface, being a two-dimensional, sheet-like base with a front portion and an oppositely-disposed rear portion and having a top surface and a bottom surface, said top surface having at its perimeter an orthogonally extending edge, and said bottom surface making an acute angle with the countertop at the front portion.
   b. retaining means fixed to the rear portion of the bottom surface for releasably retaining said receptacle in a predetermined position on the countertop.
   c. a front edge extending from the front portion and adapted to fit the edge of a sink;
   d. a cutting board supported on the top surface; and
   e. a plurality of clips secured on the top surface to releasably fasten said board thereto.

17. A cutting board assembly as described in claim 16 wherein said cutting board is supported substantially within said edge.

18. A cutting board assembly as described in claim 16 wherein said retaining means is a plurality of suction cups.

19. A cutting board assembly as described in claim 16 wherein additional means are removably attached to the cutting board and the outside of said edge.

20. A cutting board assembly as described in claim 16 wherein said retaining means is at least one magnet.

21. A cutting board assembly as described in claim 16 wherein said front edge forms a curved portion of approximately 90 radial degrees.

22. A cutting board assembly as described in claim 16 wherein the bottom surface makes an acute angle, at the edge of the sink, with the countertop.

23. A cutting board assembly as described in claim 16 wherein the front edge is a guiding means to provide a liquid runoff pathway from the top surface into the sink.

* * * * *